United States Patent
Li

(10) Patent No.: US 6,357,912 B1
(45) Date of Patent: Mar. 19, 2002

(54) CURRENT SENSING NOISE THERMOMETER

(75) Inventor: Junyun Li, Egham (GB)

(73) Assignee: Royal Holloway & Bedford New College, Egham (GB)

(*) Notice: Subject to any disclaimer, the term of this patent is extended or adjusted under 35 U.S.C. 154(b) by 0 days.

(21) Appl. No.: 09/386,041

(22) Filed: Aug. 30, 1999

(30) Foreign Application Priority Data

Aug. 28, 1998 (GB) ............................................. 9818885

(51) Int. Cl.⁷ ................................................. G01K 7/30
(52) U.S. Cl. ...................... 374/175; 374/176; 374/183; 505/847
(58) Field of Search ................................. 374/175, 176, 374/177, 185, 183; 505/160, 847

(56) References Cited

U.S. PATENT DOCUMENTS

| | | | | |
|---|---|---|---|---|
| RE25,712 E | * | 1/1965 | Slade ........................... | 336/155 |
| 3,239,787 A | * | 3/1966 | Reeber ......................... | 505/881 |
| 4,506,996 A | * | 3/1985 | Nara ............................. | 374/176 |
| 4,869,598 A | * | 9/1989 | McDonald ................... | 374/176 |
| 4,983,971 A | * | 1/1991 | Przybysz ..................... | 505/864 |
| 5,004,724 A | * | 4/1991 | De ............................... | 505/162 |
| 5,442,289 A | * | 8/1995 | Dilorio et al. ............... | 324/248 |
| 5,641,961 A | * | 6/1997 | Irwin et al. .................. | 250/336.2 |
| 5,674,008 A | * | 10/1997 | Allison ......................... | 374/183 |
| 5,880,468 A | * | 3/1999 | Irwin et al. .................. | 250/336.2 |
| 6,072,992 A | * | 6/2000 | Mishima et al. ............. | 455/76 |

FOREIGN PATENT DOCUMENTS

| | | | | |
|---|---|---|---|---|
| JP | 1297518 A | * | 11/1989 | ................. 374/183 |
| JP | 4005587 A | * | 1/1992 | ................. 324/248 |

OTHER PUBLICATIONS

"Absolute Temperature Measurement", IBM Technical Disclosure Bulletin, Apr. 1989, vol. 31, No. 11, pp. 396–397 TBD–ACC–No.: NN8904396.*

* cited by examiner

Primary Examiner—Diego Gutierrez
Assistant Examiner—Lydia M. De Jesús
(74) Attorney, Agent, or Firm—Lumen Intellectual Property Services, Inc.

(57) ABSTRACT

A current sensing noise thermometer is described, in which a low noise amplifier is used to measure the noise current in a sensor resistor and the sensor resistor is connected in series with a superconducting coil, or a coil assembly including at least one superconductor. The superconductor of the coil assembly is preferably positioned inside the coil, and the superconducting transition temperature of the superconductor is used to calibrate the thermometer. Preferably, the sensor resistor is grounded to enable particularly low temperatures to be achieved.

22 Claims, 2 Drawing Sheets

CURRENT SENSING NOISE THERMOMETER

CROSS REFERENCE TO RELATED APPLICATIONS

This application claims priority from British Patent application number 9818885.7 filed Aug. 28, 1998 which is herein incorporated by reference.

FIELD OF THE INVENTION

The present invention relates to a current sensing noise thermometer.

BACKGROUND

It has long been desirable in the field of low temperature physics to find an easy way to measure precisely temperatures below the Kelvin range and into an achievable milli-Kelvin range. A known principle for such low temperature thermometry is the measurement of the thermal (Johnson) noise in a resistor, which can then be used to determine the temperature of the resistor.

One method which uses this principle involves the use of a Josephson junction shunted by a current biased resistor. The resulting Josephson frequency oscillation is influenced by the thermal noise in the resistor, causing frequency fluctuations, the variance of which is proportional to the temperature. The measurement of frequency variance, however, means that long measurement times are necessary in order to achieve good precision. In addition, the current bias causes dissipation which limits the effectiveness of the method for cooling down the resistor at sub-mK temperatures.

An alternative method is current sensing noise thermometry, in which the thermal noise currents in a resistor are measured directly using a low noise amplifier, such as a SQUID. This method can be used to achieve much faster measurements with considerable precision, and because the resistor need not be current biased, lower temperatures can be achieved in principle.

In principle, such a current sensing noise thermometer can be used as a primary thermometer (absolute thermometer) in the case where the sensor resistance, circuit time constant, gain of the SQUID read-out system, etc., have been precisely measured. This measurement could be a rather difficult task and those parameters could be changed by a different SQUID read-out system or setup from place to place or time to time. This is not a convenient way at all for using it practically. Another approach is using the current sensing noise thermometer as secondary thermometer with a known temperature point, but this still presents the problem that the calibration procedure against a known temperature is quite complicated. Typical calibration methods involve placing the resistor in liquid helium, and measuring the vapor pressure of the helium, to determine the temperature for precise calibration, or using fixed-point devices. Numerous complicated measurements and setups may also be involved in the use of known current sensing noise thermometers.

Furthermore, it is difficult to cool the resistor to temperatures sufficiently low to enable the thermometer to be used at temperatures in the mK and RK range, because of Kapitze resistance between the thermometer and substrate in known designs.

SUMMARY OF THE INVENTION

The present invention, from one aspect, provides a current sensing noise thermometer comprising a sensor resistor and a low noise amplifier for measuring the noise current in the resistor, characterized in that a coil made from superconducting material is connected in series between the resistor and the amplifier whereby to allow the superconducting transition temperature of the superconducting material to be used to calibrate the thermometer.

Another aspect of the invention provides a current sensing noise thermometer comprising a sensor resistor and a low noise amplifier for measuring the noise current in the resistor, characterized in that a superconducting coil assembly is provided, the coil assembly comprising a coil made from superconducting material and at least one superconductor positioned in close proximity to the coil whereby to influence the action of the coil, and the coil assembly is connected in series between the resistor and the amplifier whereby to allow the superconducting transition temperature of at least one superconductor of the coil assembly to be used to calibrate the thermometer.

Preferably, at least one superconductor of the coil assembly is positioned at least partially inside the coil. In a further preferred embodiment, at least one superconductor is, in use, placed in contact with an object whose temperature is to be measured.

From a further aspect the invention provides a current sensing noise thermometer comprising a sensor resistor and a low noise amplifier for measuring the noise current in the sensor resistor, characterized in that the resistor is grounded.

The advantage of using an grounded sensor resistor is that the resistor can be cooled down to the lowest possible electronic temperature, in the low $\mu K$ range.

Another aspect of the invention provides a method of current sensing noise thermometry comprising the steps of positioning a sensor resistor in close proximity to an object whose temperature is to be measured, measuring the noise current in the resistor by means of a low noise amplifier, and recording and/or displaying information derived from the measured noise current which represents the temperature of the resistor, characterized in that a superconducting element is connected to the sensor resistor and at least one superconducting transition temperature of the superconducting element is used for calibration purposes.

Preferably, the influence of a change in magnetic flux in the superconducting element at the superconducting transition temperature is used for calibration purposes. A plurality of superconductors may be used as the superconducting element.

In a preferred embodiment of the invention, an grounded sensor resistor is used in conjunction with a superconducting coil, or a coil assembly comprising one or more superconductors. This provides the advantage that the change in inductance of the coil at the known superconducting transition temperature of the superconductor(s) can be used to calibrate temperature measurements derived from the noise current measurements, as the resistor is cooled to low temperatures.

The low noise amplifier may be a SQUID, preferably a DC SQUID. In a preferred embodiment, the method can be used with any setup or SQUID read-out system without knowing their parameters and it does not need any external fixed temperature point. This kind of thermometer could be calibrated by itself in situ.

The coil and/or at least one superconductor preferably comprises a niobium-based superconductor.

In an alternative embodiment, a high temperature superconductor may be used for the coil and/or at least one superconductor in the coil assembly, instead of a low temperature superconducting material. By this method, a temperature measurement range from 77K to sub-mK temperatures may be achieved. In another alternative embodiment, several superconductors may be provided in the coil assembly, thereby providing several calibration temperatures, preferably over a large temperature range.

An embodiment of the invention will now be described by way of example, with reference to the accompanying drawings in which:

DETAILED DESCRIPTION

Figure 1:
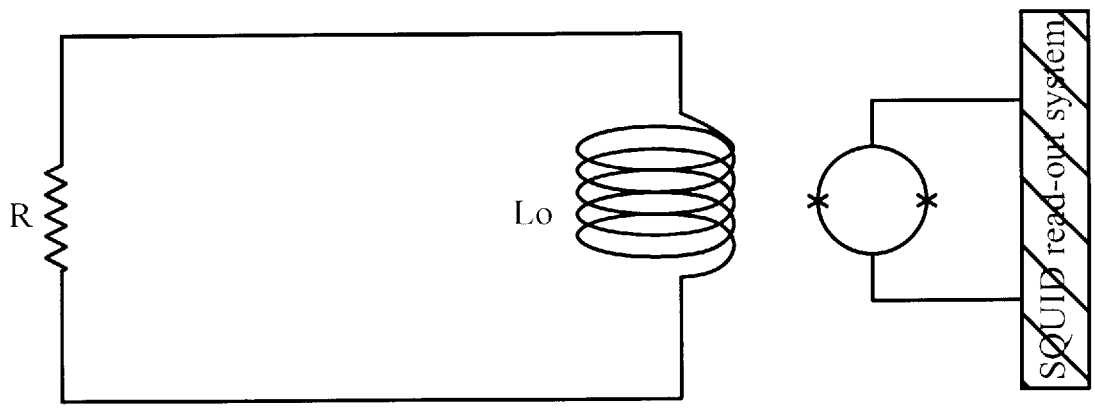
FIG. 1 shows a schematic diagram representing a known method of current sensing noise thermometry.

Referring to the known method illustrated by FIG. 1, a SQUID is used to measure the noise current in the resistor R, by connecting the resistor to the input coil $L_o$ of the SQUID.

The noise density $\langle I_N^2 \rangle$ is given by the expression:

$$\langle I_N^2 \rangle = \frac{4K_B T}{R}\left(\frac{1}{1+(2\pi f)^2(L_o/R)^2}\right) \quad (1)$$

where T is the temperature, $K_B$ is the Boltzmann constant, and f is the frequency. The inductance of the circuit is dominated by the input inductance $L_o$.

Therefore, at low frequency range the noise current density is proportional to the temperature, and is frequency independent, and so the temperature can be determined from the noise current measurement. At high frequency range, the noise current will be related to the inductance of the circuit.

Figure 2:
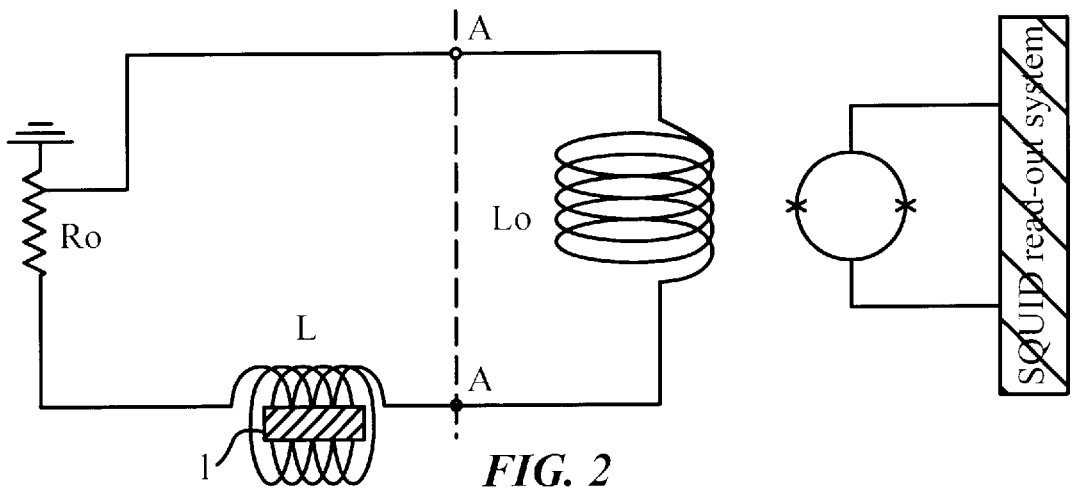
FIG. 2 shows a schematic diagram according to a preferred embodiment of the invention.

The embodiment illustrated in FIG. 2 uses an grounded sensor resistor $R_o$ connected in series with a superconducting coil L, and connected with the SQUID input coil $L_o$ as shown. The earthing of the resistor allows it to be cooled to a temperature of a few micro Kelvin. A superconductor 1 is positioned inside the coil L and all connections to the resistor are preferably made from superconducting material, in order not to provide any additional Johnson noise.

In accordance with equation (1) above, the noise current is given by:

$$\langle I_N^2 \rangle = \frac{4K_B T}{R_i}\left(\frac{1}{1+(2\pi f)^2(L_i/R_i)^2}\right) \quad (1)$$

where $R_i$ is the total resistance including the resistance $R_o$ of the resistor and $L_i$ is the combined inductance of the SQUID input coil $L_o$ and the superconducting coil L, which is dominant in the circuit.

Below the transition temperature of the superconductor, the inductance of the coil changes (due to the Meissner effect), so that the noise current below the transition temperature is given by:

$$\langle I_N^2 \rangle = \frac{4K_B T}{R_j}\left(\frac{1}{1+(2\pi f)^2(L_j/R_j)^2}\right). \quad (1)$$

In this case $R_j$ is the total resistance and $L_j$ is the combined inductance of the SQUID input coil and the superconducting coil below the transition temperature, which is dominant in the circuit.

The temperature measurements made by measurement of the noise current density can be calibrated based on the known temperature at the point where the change in inductance is observed.

FIG. 2 shows a line A—A, representing the division between the noise current measuring device and a separate thermometer unit, in a preferred embodiment. Everything to the right of the line A—A in FIG. 2 is a conventional DC SQUID, which is connected to a thermometer unit represented by the components to the left of the line A—A, as described above.

Figure 3A:
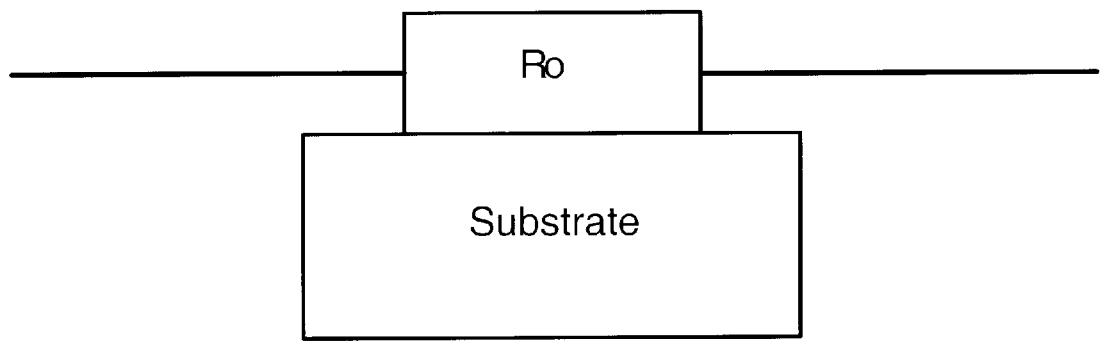
FIGS. 3A–3B show schematic diagrams presenting a side view and a top view of the sensor resistor of FIG. 2 mounted on a substrate according to a preferred embodiment of the invention.
Figure 3B:
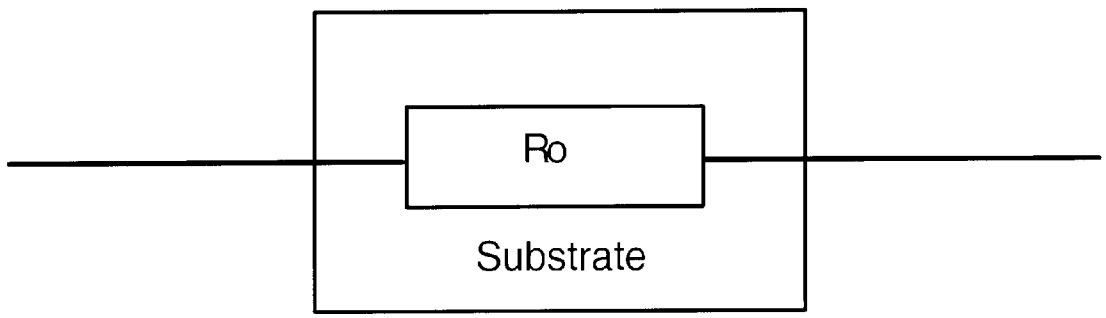

The sensor resistor $R_o$ is preferably mounted on a substrate as shown in FIGS. 3A and 3B, which may then be placed in contact with an object whose temperature is to be measured. In a preferred embodiment, one end of the resistor may be positioned to make contact with a low temperature plate, preferably being mounted by screws, in order to monitor the temperature of the plate. The use of a substrate makes it possible to reduce problems caused by vibrations.

Preferably, the substrate is a good thermal conductor, and it may also have anti-vibration properties.

Preferably, the substrate is a good electrical conductor and is made of a machinable material, in which case the substrate can conveniently be used to provide connections between the various components. For example, terminals may be arranged on the substrate for mounting the coil and providing the earth connection or any other required connections.

What is claimed is:

1. A current sensing noise thermometer for measuring a temperature of an object comprising a sensor resistor, a low noise amplifier for measuring the noise current in the resistor, and a coil made from superconducting material connected in series between the resistor and the amplifier to allow the superconducting transition temperature of the superconducting material to be used to calibrate the thermometer.

2. The current sensing noise thermometer according to claim 1, wherein the coil comprises a niobium based superconductor.

3. The current sensing noise thermometer according to claim 1, wherein the coil comprises a high temperature superconducting material.

4. The current sensing noise thermometer according to claim 1, wherein the sensor resistor is grounded.

5. The current sensing noise thermometer according to claim 1, wherein the low noise amplifier is a SQUID.

6. The current sensing noise thermometer according to claim 1, wherein the sensor resistor is mounted on a substrate.

7. The current sensing noise thermometer according to claim 6, wherein the substrate is placed in contact with the object.

8. The current sensing noise thermometer according to claim 7, wherein the substrate provides electrical connections between the sensor resistor and the object.

9. The current sensing noise thermometer according to claim 6, wherein the substrate exhibits anti-vibration properties.

10. The current sensing noise thermometer according to claim 1, wherein the amplifier is connected to a read-out system.

11. A current sensing noise thermometer for measuring a temperature of an object comprising a sensor resistor, a low noise amplifier for measuring the noise current in the resistor, and a coil assembly comprising a coil made from superconducting material and at least one superconductor positioned in close proximity to the coil to influence the action of the coil, wherein the coil assembly is connected in series between the resistor and the amplifier to allow the superconducting transition temperature of the at least one superconductor of the coil assembly to be used to calibrate the thermometer.

12. The current sensing noise thermometer according to claim 11, wherein the at least one superconductor of the coil assembly is positioned at least partially inside the coil.

13. The current sensing noise thermometer according to claim 11, wherein the at least one superconductor of the coil assembly is placed in contact with the object.

14. The current sensing noise thermometer according to claim 11, wherein the coil assembly comprises several different superconductors, whereby a plurality of differing calibration temperatures is provided.

15. The current sensing noise thermometer according to claim 11, wherein at least one of the coil and the at lease one superconductor comprises a niobium based superconductor.

16. The current sensing noise thermometer according to claim 11, wherein at least one of the coil and the at least one superconductor comprises a high temperature superconducting material.

17. A method of current sensing noise thermometry comprising the steps of positioning a sensor resistor in close proximity to an object whose temperature is to be measured, measuring the noise current in the resistor by means of a low noise amplifier, and recording and/or displaying information derived from the measured noise current which represents the temperature of the resistor, characterized in that a superconducting element is connected to the sensor resistor and at least one superconducting transition temperature of the superconducting element is used for calibration purposes.

18. The method according to claim 17, wherein the influence of a change in magnetic flux in the superconducting element at the superconducting transition temperature is used for calibration purposes.

19. The method according to claim 17, wherein the superconducting element comprises a coil made from superconducting material.

20. The method according to claim 17, wherein a plurality of superconductors is used as the superconducting element.

21. The method according to claim 17, wherein at least one superconductor of the superconducting element is positioned in close proximity to a coil made from superconducting material, whereby to influence the action of the coil.

22. The method according to claim 21 wherein the change in inductance of the coil at the superconducting transition temperature of at least one of the coil and the at least one superconductor is used for calibration purposes.

* * * * *